(12) United States Patent
Umetsu et al.

(10) Patent No.: US 7,766,339 B2
(45) Date of Patent: Aug. 3, 2010

(54) SEAL RING

(75) Inventors: Kyohei Umetsu, Nihonmatsu (JP);
Nobuyuki Eguchi, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 30 days.

(21) Appl. No.: 11/878,052

(22) Filed: Jul. 20, 2007

(65) Prior Publication Data
US 2008/0023919 A1 Jan. 31, 2008

Related U.S. Application Data

(62) Division of application No. 10/515,917, filed as application No. PCT/JP03/06781 on May 29, 2003, now Pat. No. 7,654,536.

(30) Foreign Application Priority Data
May 29, 2002 (JP) .............................. 2002-155607

(51) Int. Cl.
F02F 5/00 (2006.01)
F16J 15/00 (2006.01)
(52) U.S. Cl. ...................... 277/496; 277/579; 277/631
(58) Field of Classification Search ......... 277/496–499, 277/579, 631
See application file for complete search history.

(56) References Cited

U.S. PATENT DOCUMENTS 2,325,298 A * 7/1943 Barnes ........................ 277/471
2,459,395 A * 1/1949 Smith ......................... 277/460
2,462,586 A * 2/1949 Whittingham ............... 277/452
2,569,777 A * 10/1951 Phillips ....................... 277/499
2,970,023 A * 1/1961 Thompson ................... 277/460
3,887,198 A 6/1975 McClure et al. .............. 277/27
4,522,415 A * 6/1985 Dworak et al. .............. 277/434
4,815,429 A * 3/1989 Thornton .................. 123/193.6
5,253,878 A 10/1993 Miura ......................... 277/220
5,934,680 A * 8/1999 Kakehi et al. ............... 277/499
6,715,767 B1 * 4/2004 Meernik et al. ............. 277/459
6,997,460 B2 * 2/2006 Brunke ....................... 277/460

FOREIGN PATENT DOCUMENTS

JP 63-141357 9/1988
JP 10-169782 6/1998

* cited by examiner

Primary Examiner—Vishal Patel
(74) Attorney, Agent, or Firm—Jacobson Holman PLLC

(57) ABSTRACT

A seal ring for sealing an annular clearance between two members, which are made rotatable relative to each other. The seal ring is provided with a relief 5 throughout the circumference of a sliding face side to confront the side wall face 72 of an annular groove 71. This relief 5 is set to have a radially smaller width in the vicinity of a separate portion 2 and a radially larger width at a position apart from the separate portion 2, and the portion of the relief 5 to transit from the narrower portion to the wider portion is set to have a gradually changing width.

4 Claims, 13 Drawing Sheets

SEAL RING

This is a divisional application of application Ser. No. 10/515,917, filed Jul. 12, 2005, now U.S. Pat. No. 7,654,536 which in turn is a U.S. stage application under 35 U.S.C. 371 of PCT/JP03/06781, filed May 29, 2003 and published in Japanese.

TECHNICAL FIELD

This invention relates to a seal ring for sealing an annular clearance between two members which are made rotatable relative to each other.

BACKGROUND ART

In the conventional art, the seal ring of this kind is used in a variety of hydraulic apparatus such as an automatic transmission for an automobile.

A general seal ring will be described with reference to FIG. 11 and FIG. 12. FIG. 11 is a perspective view showing the mounted state of a seal ring according to the conventional art. FIG. 12 is a schematic section showing the mounted state of the seal ring according to the conventional art.

The shown seal ring 100 seals the annular clearance between a housing 800 that has a bore and a shaft 700 inserted in the bore. This seal ring 100 is mounted for use in an annular groove 701 formed in the shaft 700.

The seal ring 100 is made of a resin material. The seal ring 100 is provided with a first sealing face 100a for sealing the inner circumference 800a of the bore formed in the housing 800, and a second sealing face 100b for sealing the side wall face 701a of the annular groove 701 formed in the shaft 700.

When a pressure is applied in the direction of arrow P, as shown, from the sealing fluid to the unsealing fluid, the seal ring 100 is pushed to the side of the unsealing fluid. Therefore, the second sealing face 100b pushes the side wall face 701a of the annular groove 701. On the other hand, the first sealing face 100a pushes the inner circumference 800a of the bore confronting the annular groove 701. Thus, the first sealing face 100a and the second sealing face 100b seal at their respective positions.

Therefore, the seal ring 100 can prevent the sealing fluid from leaking to the side of the unsealing fluid.

Here, the sealing fluid is exemplified by lubricating oil, and indicates the ATF (Automatic Transmission Fluid) in case it is used in the transmission of an automobile.

On the other hand, the ring body of the seal ring 100 is provided with a separate portion 101 at one circumferential portion, as shown. One reason for this provision is to facilitate the work for mounting the seal ring 100 in position.

A variety of types have been known as that mode of the separate portion 101. The example shown in FIG. 11 and FIG. 12 is a special step cut. This special step cut has a construction cut into two steps. By adopting this special step cut, the leakage can be reduced to properly match the change in the ambient temperature.

This special step cut is provided with a pair of a projection 101a and a depression 101d on one outer circumferential side across the separated portion and a pair of a depression 101c and a projection 101b on the other outer circumferential side. The construction is further made such that the projection 101a and the depression 101c fit each other whereas the depression 101d and the projection 101b fit each other.

The seal ring 100 adopting such special step cut can block the sealing fluid side and the unsealing fluid side such that the faces perpendicular to the circumferential direction form clearances with respect to the circumferential direction. As a result, even if the ring body is expanded or contracted by the ambient temperature, the seal ring 100 can absorb the changes in the sizes of the clearances while keeping the sealed state. As a result, the seal ring 100 can keep its sealing properties stably against the surrounding temperature change.

In recent years, the various hydraulic apparatus such as the automatic transmission for the automobile has needs of not only the leakage reduction but also the reduction of the friction of the sliding rotations for the seal ring used in the automatic transmission with a view to improving the fuel economy and the performance.

As shown in FIG. 13 and FIG. 14, therefore, there is known a structure which is reduced in the pressure receiving area of the sealing faces. FIG. 13 is a perspective view showing the mounted state of the seal ring according to the conventional art. FIG. 14 is a schematic section showing the mounted state of the seal ring according to the conventional art. The seal ring, as shown in these Figures, according to the conventional art is constructed to reduce the friction of the sliding rotations from that of the seal ring according to the conventional art as shown in FIG. 11 and FIG. 12.

This seal ring 200 is provided, like the aforementioned seal ring 100, with a first sealing face 200a, a second sealing face 200b, and a separate portion 201 having a special step cut (including a projection 201a, a depression 201d, a depression 201c and a projection 201b).

In order to reduce the pressure receiving area (or the sliding area) on the sidewall face 701a of the annular groove 701, moreover, this seal ring 200 is provided with a relief (as can also be called the "depression", "notch" or "recess").

Thus, this seal ring 200 contemplates to reduce the friction of the sliding rotations by reducing the pressure receiving area.

In case the side wall face 701a of the annular groove 701 is perpendicular to the groove bottom (that is, in case the second sealing faces 100b and 200b and the side wall face 701a are parallel to each other), the aforementioned seal rings 100 and 200 seal throughout their circumferences. Therefore, the problem of the leak does not arise.

However, the annular groove 701 may have its side wall face sloped such that its bottom is narrow and such that it becomes the wider as it comes the closer to its upper face. Generally, the slope occurs when the annular groove 701 is formed by the cutting work. In this case, there arises a problem that the sealing performance is not done throughout the circumference of the seal ring so that the leakage increases. This point will be described with reference to FIG. 15 to FIG. 18.

The case of the aforementioned seal ring 100 is shown in FIG. 15 and FIG. 16. In case the side wall face 702a of an annular groove 702 is sloped, as shown, a sealing portion S is formed of only the lower end of the seal ring 100. In short, the sealing action is performed in a substantially linear contact.

The reason for the expression of not merely the "linear contact" but the "substantially linear contact" is described in the following. This is because the contact is practically made through a face having a small width so that it is so grasped rather by the facial contact but not by the linear contact as to invite a misunderstanding. This expression also applies to the following description.

A clearance X usually exists in the seal ring 100 adopting the special step cut at the separate portion 101, as shown.

This is because the seal ring 100 adopting the special step cut is constructed such that the clearance is formed between the faces perpendicular to the circumferential direction so as to correspond to the change in the ambient temperature.

In case the sealing action is performed by the substantially linear contact in the sealing portion S, as described above, it is apparent from the FIGS that an unsealed portion arises in the clearance X. Therefore, a leak occurs (at a leaking portion A).

On the other hand, the case of the aforementioned seal ring 200 is shown in FIG. 17 and FIG. 18.

In this case, the sealing portion S is formed at the lower end of the seal ring 200 in the portion having no relief 202 and at the step portion over the relief in the portion having the relief 202, as shown. In this case, too, the leak occurs (at leaking portion A) from the clearance X as in the case of the aforementioned seal ring 100.

In the case of this seal ring 200, on the other hand, the sealing portion S is formed of the stepped portion over the relief 202, as shown, in the portion apart from the separate portion 201. In the vicinity of the separate portion 201, however, the sealing portion S is formed at the lower end of the seal ring 200, as shown. At the stepped portion over the relief, as shown, the sealing portion cannot be sufficiently formed to make the sealing properties unstable (as indicated at portion Y).

This results in that the leak also occurs at this portion (i.e., a leaking portion B).

A seal ring 300 having a trapezoidal section is also known, as shown in FIG. 19 to FIG. 22.

This seal ring 300 is given a trapezoidal shape for the sealing portion S of the substantially linear contact so as to reduce the sliding friction. Specifically, the seal ring 300 forms the sealing portion S at the upper end edge of the annular groove 701.

In this case of the seal ring 300, moreover, the sealing portion S is so formed at the upper end edge of the annular groove as to make the substantially linear contact not only in case the side wall face of the annular groove is perpendicular to the groove bottom, as shown in FIG. 19 and FIG. 20, but also in case the side wall face is sloped with respect to the groove bottom, as shown in FIG. 21 and FIG. 22.

In this case of the seal ring 300, a leak occurs through a clearance Z between the projection and the depression in the special step cut no matter whether the side wall face of the annular groove might be inclined or not. The leakage is varied with the slope of the annular groove thereby to raise a problem that the stable leaking characteristics cannot be obtained.

If the side wall face 702a of the annular groove 702 is sloped in the aforementioned case of the seal ring 200, moreover, the sealing portion S is formed of the lower end of the seal ring 200 and the step portion over the relief 202, as shown in FIG. 17, so that a portion (as designated by Y in FIG. 17) of unstable sealing properties is formed.

It is, therefore, conceivable to eliminate the step by forming the relief throughout the circumference, as shown in FIG. 23 and FIG. 24. FIG. 23 is a perspective view showing the mounted state of the seal ring according to a virtual art. FIG. 24 is a schematic section showing the mounted state of the seal ring according to the virtual art.

In the case of this seal ring 400, as shown, a relief 402 is formed throughout the circumference of the ring. Thus, no step is formed in the sealing portion.

Even in case the side wall face 702a of the annular groove 702 is sloped, therefore, only the upper portion of the relief 402 can provide the sealing portion S, as shown, to eliminate the portion of the unstable sealing properties.

In this case of the seal ring 400, however, like the aforementioned case of the seal ring 300 of the trapezoidal section, the leak occurs through the clearance Z between the depression and the projection in a separate portion 401 adopting the special step cut, no matter whether the side wall face of the annular groove might be vertical to or sloped with respect to the groove bottom. With the relief 402 being in the vicinity of the separate portion, moreover, the leakage may become more from that clearance Z.

DISCLOSURE OF THE INVENTION

The conventional art has found it difficult to reduce the leakage sufficiently, in case the side wall face of the annular groove is sloped with respect to the groove bottom. A demand is also made for reducing the friction of the sliding rotations.

An object to provide a seal ring which contemplates to reduce the leakage together with the friction of the sliding rotations.

The present invention is applied to a seal ring for sealing an annular clearance between two members which are assembled rotatably concentrically with and relative to each other. The seal ring comprises: a first sealing face for sealing the surface of one of the two members; and a second sealing face for sealing such a side wall face of the annular groove formed in the other member as is located on the side of an unsealing fluid.

The seal ring is provided with a separate portion separated at one circumferential portion.

In order to achieve the aforementioned object, in the invention, a relief kept out of abutment against the side wall face of the annular groove on the side of the unsealing fluid is formed throughout the circumference of the second sealing face.

By forming the relief throughout the circumference, the sliding area (or the pressure receiving area) on the side wall face of the annular groove on the side of the unsealing fluid can be reduced to reduce the friction of the sliding rotations.

In the invention according to claim 1 or 2, moreover, the relief is set to have a smaller radial width in the vicinity of the separate portion and a larger radial width at a position apart from the separate portion.

If a relief having an equal radial width is formed throughout the circumference so as to reduce the sliding area, the leakage of the sealing fluid in the vicinity of the separate portion may increase.

In the invention according to claim 1 or 2, therefore, the radial width of the relief is narrowed in the vicinity of the separate portion to reduce the leakage of the sealing fluid.

In the invention according to claim 1, moreover, the portion of the relief to transit from the narrower portion to the wider portion is set to have a gradually changing width.

In the case of the construction the relief portion quickly transits from the narrower portion to the wider portion, the unstable portion having no contact with the side wall face of the annular groove on the side of the unsealing fluid exists over a wide range, if the side wall face has a slope different from the second sealing face.

Therefore, the construction of the invention is intended to minimize the unstable portion having no contact with the side wall face.

This construction makes it possible to reduce the leakage of the sealing fluid.

However, the portion of the relief to transit from the narrower portion to the wider portion can achieves the object of the invention if it can reduce the leakage of the sealing fluid, even if it contains the portion other than the gradually width changing portion.

In the invention according to claim 2, therefore, the portion of the relief to transit from the narrower portion to the wider portion contains a gradually width-changing portion.

In the invention according to claim 3, on the other hand, a continuous annular sealing portion for sealing the side wall face of the annular groove is formed on the second sealing face even in the state where the slope of the side wall face of the annular groove on the side of the unsealing fluid and the slope of the second sealing face are different.

With this construction, the sealing portion is not interrupted by the annular sealing portion for the side wall face of the annular groove on the side of the unsealing fluid, so that the leakage of the sealing fluid can be reduced.

It is preferable that the annular sealing portion is kept in a state to continuously contact with the side wall face of the annular groove on the side of the unsealing fluid irrespective of a change in the size of a clearance between such faces of the separate portion as are substantially perpendicular to the circumferential direction.

With this construction, the stable sealing properties can be exhibited even in case the seal ring is expanded or contracted by the ambient temperature to change the size of the clearance between the faces in the separate portion perpendicular to the circumferential direction.

The aforementioned annular sealing portion can be realized by forming the aforementioned relief so that the formation of the sealing portion may not be obstructed.

The separate portion can contain a separating face concentric to the first sealing face, and such an end edge of the separating face as is located on the side of the annular groove on the side of the unsealing fluid forms a portion of the annular sealing portion.

In other words, the end edge of the separating face on the side of the side wall face of the annular groove on the side of the unsealing fluid is utilized as a portion of the annular sealing portion so that the continuous annular sealing portion for seating the side wall face can be formed without interrupting the sealing portion at the separate portion.

This separate portion can be exemplified by the special step cut or the step cut.

Here, the special step cut has a separate structure, in which the stepped separate portion is formed at each of the two sealing faces in the seal ring.

Moreover, the separate portion contains the separating face extending in the circumferential direction, and this separating end edge is formed as a portion of the stepped separate portion on the sealing face on the side wall face of the annular groove on the side of the unsealing fluid.

On the other hand, the step cut is a separate structure, in which a stepped separate portion is formed on that of two sealing faces in the seal ring, which is located on the side of the side wall face of the annular groove on the side of the unsealing fluid.

Moreover, the separate portion contains the separating face extending in the circumferential direction, and this separating end edge is formed as a portion of the stepped separate portion.

BEST MODE FOR CARRYING OUT THE INVENTION

Preferred embodiments of the invention will be illustratively described in detail with reference to the accompanying drawings. However, the sizes, materials, shapes and relative arrangements of components described in the embodiment will not be intended to limit the scope of the invention thereto so long as they are not especially specified.

First Embodiment

Figure 1:
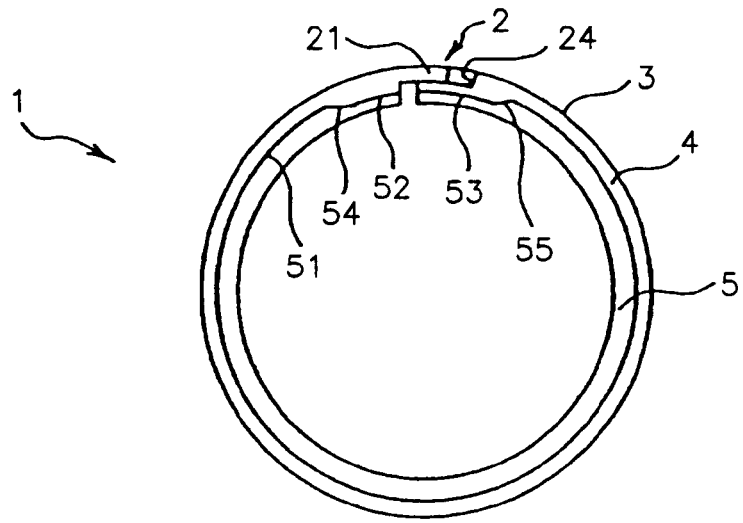
FIG. 1 is a top plan view of a seal ring according to a first embodiment of the invention.
Figure 2A:
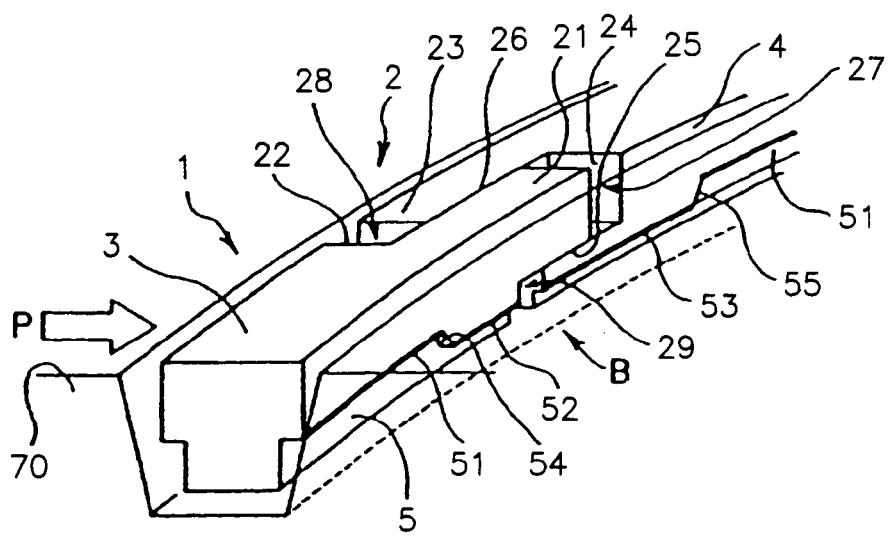
FIG. 2A is a partially broken perspective view showing the state, in which the seal ring according to the first embodiment of the invention is mounted.
Figure 2B:
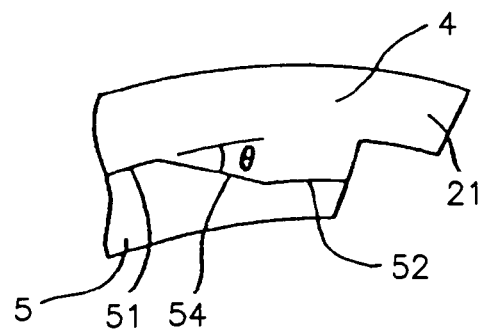
FIG. 2B is an enlarged view of a portion taken in a direction B of FIG. 2A.
Figure 3A:
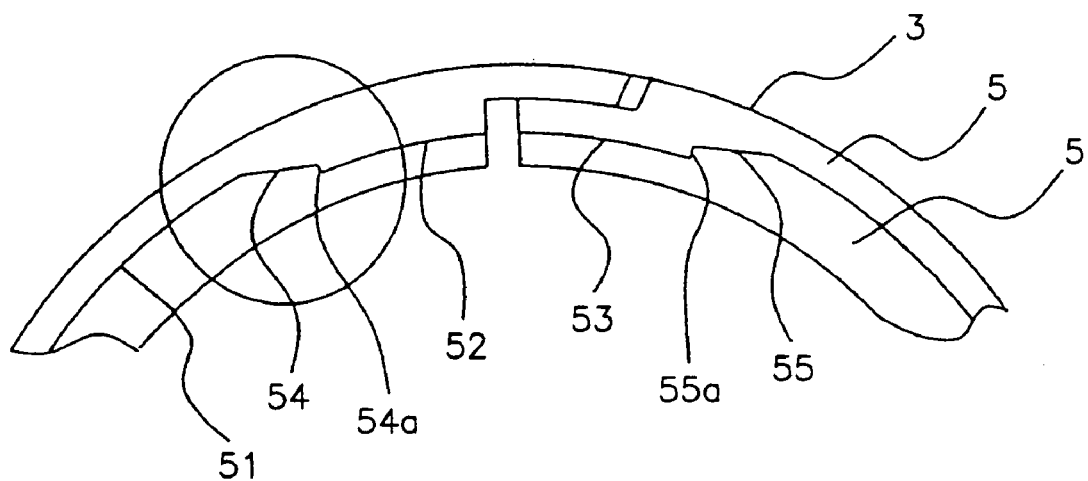
FIG. 3A is a portion of a top plan view showing a modification of the seal ring according to the first embodiment of the invention.
Figure 3B:
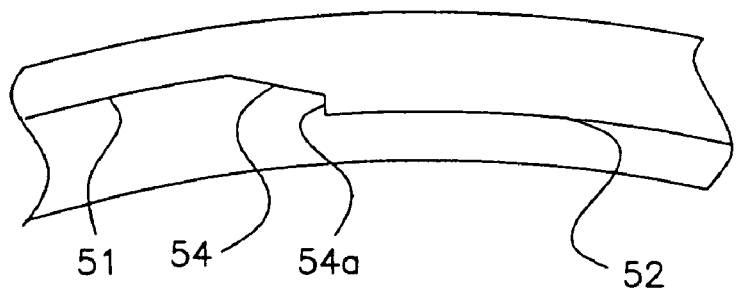
FIG. 3B is an enlarged view of a portion of FIG. 3A.
Figure 3C:
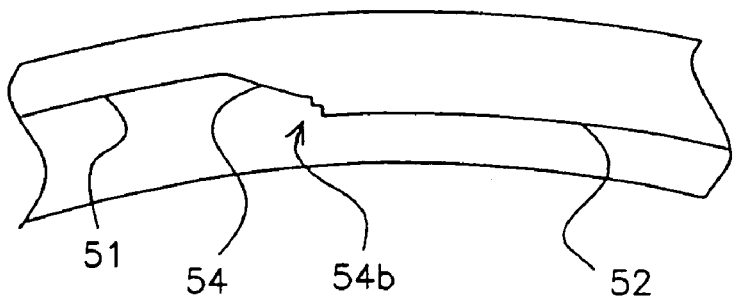
FIG. 3C is an enlarged view of a portion of the top plan view showing a modification of the seal ring according to the first embodiment of the invention.
Figure 4:
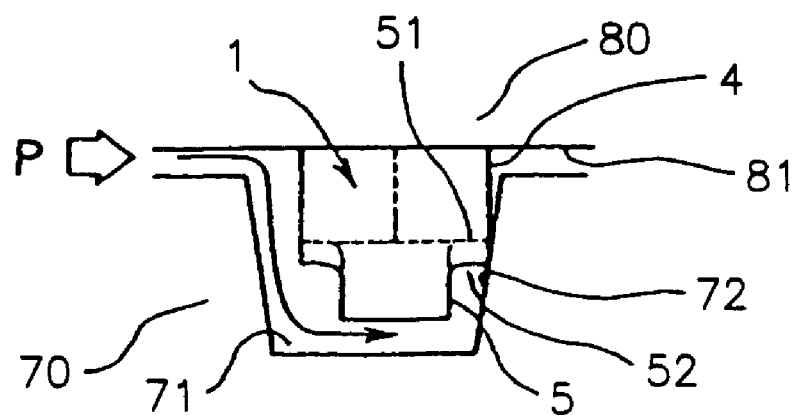
FIG. 4 is a schematic section showing the state, in which the seal ring according to the first embodiment of the invention is mounted.

A seal ring according to a first embodiment of the invention will be described with reference to FIG. 1 to FIG. 4. FIG. 1 is a top plan view of a seal ring according to a first embodiment of the invention. FIG. 2A is a broken perspective view showing a portion of the state, in which the seal ring according to the first embodiment of the invention is mounted, and FIG. 2B is an enlarged view of a portion taken in a direction B of FIG. 2A. FIG. 3A is a portion of a top plan view showing a modification of the seal ring according to the first embodiment of the invention; FIG. 3B is an enlarged view of a portion of FIG. 3A (i.e., an encircled portion of FIG. 3A); and FIG. 3C is an enlarged view of a portion of the top plan view showing a modification of the seal ring according to the first embodiment of the invention. FIG. 4 is a schematic section showing the state, in which the seal ring according to the first embodiment of the invention is mounted.

As shown, the seal ring 1 seals the annular clearance between a housing 80 that has a bore and a shaft 70 inserted in the bore. This seal ring 1 is mounted for use in an annular groove 71 formed in the shaft 70.

The seal ring 1 is made of a resin material. The seal ring 1 is provided with a first sealing face 3 for sealing the inner circumference 81 of the bore formed in the housing 80, and a second sealing face 4 for sealing the side wall face 72 of the annular groove 71 formed in the shaft 70.

When a pressure is applied in the direction of arrow P, as shown in FIGS. 2 and 4, from the sealing fluid to the unsealing fluid, the seal ring 1 is pushed to the side of the unsealing fluid. Therefore, the second sealing face 4 pushes the side wall face 72 of the annular groove 71.

On the other hand, the first sealing face 3 pushes the inner circumference 81 of the bore confronting the annular groove 71. Thus, the first sealing face 3 and the second sealing face 4 seal at their respective positions.

Therefore, the seal ring 1 can prevent the sealing fluid from leaking to the side of the unsealing fluid.

Here, the sealing fluid is exemplified by lubricating oil, and indicates the ATF (Automatic Transmission Fluid) in case it is used in the transmission of an automobile.

On the other hand, the ring body of the seal ring 1 is provided with a separate portion 2 at one circumferential portion, as shown. One reason for this provision is to facilitate the work for mounting the seal ring 1 in position.

A variety of types have been known as that mode of the separate portion 2. In this embodiment, a special step cut is adopted as the separate portion 2. This special step cut has a construction cut into two steps. Specifically, each of the first sealing face 3 and the second sealing face 4 is provided with the stepped separate portion, as shown. By adopting this special step cut, the leakage can be reduced to properly match the change in the ambient temperature.

This special step cut is provided with a pair of a projection 21 and a depression 22 on one outer circumferential side across the separated portion and a pair of a depression 24 and a projection 23 on the other outer circumferential side. The construction is further made such that the projection 21 and the depression 24 fit each other whereas the depression 22 and the projection 23 fit each other.

The seal ring 1 adopting such special step cut can block the sealing fluid side and the unsealing fluid side such that the faces perpendicular to the circumferential direction form clearances (i.e., a clearance 27 formed between the leading end face of the projection 21 and the confronting face of the depression 24, a clearance 28 formed between the leading end face of the projection 23 and the confronting face of the depression 22, and a clearance 29 on the inner circumferential side, as shown in FIG. 2) with respect to the circumferential direction.

In other words, the projection 21 and the depression 24 are constructed to make sliding contact with not only a separating face 25 concentric with the first sealing face 3 but also a separating face 26 perpendicular to the axis.

This construction leaves any portion uninterrupted in the first sealing face 3 and in the second sealing face 4 by the separate portion 2, even if the seal ring 1 has the clearance 27, the clearance 28 and the clearance 29, as described above.

Therefore, even if the seal ring 1 is expanded or contracted of its body by the ambient temperature to fluctuate the spacings of the clearance 27, the clearance 28 and the clearance 29, it can absorb the changes in the sizes of the clearances while keeping the sealed state.

As a result, the seal ring 1 can keep its sealing properties stably against the surrounding temperature change.

In order to satisfy the needs for reducing the friction of the sliding rotations, moreover, the seal ring 1 according to this embodiment is provided throughout its circumference with a relief (e.g., a depression, a notch or a lighting portion) 5 for reducing the pressure receiving area of the sliding face of the annular groove 71 against the side wall face 72.

Thus, the seal ring 1 according to this embodiment contemplates to reduce the friction of the sliding rotations by reducing the pressure receiving area.

In this embodiment, moreover, the step is formed in the boundary between the second sealing face 4 and the relief 5 in the vicinity of the separate portion 2.

As a result, the relief 5 is radially narrowed near the separate portion 2 and radially widened at the portion apart from the separate portion 2. Specifically, a step is formed between a boundary 51 at a position apart from the separate portion 2 and a boundary 52 and 53 in the vicinity of the separate portion 2, as shown in FIG. 1 and FIG. 2. Moreover, the boundaries 52 and 53 are arranged on the inner circumference side of the separating face 25.

Thus in the vicinity of the separate portion 2, the leakage of the sealing fluid can be reduced by narrowing the relief radially of the relief 5, while satisfying the needs for reducing the friction of the sliding rotations.

In this embodiment, on the other hand, the potion of the relief 5 to transit from the narrow portion to the wide portion is set to have gradually changing width. Specifically, the relief 5 is provided with a slope 54 between the boundary 51 and the boundary 52 and a slope 55 between the boundary 51 and the boundary 53.

The sloping angle (i.e., the angle with respect to the boundary 51, as shown in FIG. 2B) θ of those slopes 54 and 55 is set to 10 degrees or less, preferably about 5 degrees.

In case the slope of the side wall face 72 of the annular groove 71 and the slope of the second sealing face 4 are made substantially equal to each other by the construction thus far described, the substantial entirety of the second sealing face 4 makes sliding contact with the side wall face 72 so that the construction sufficiently exhibits the sealing properties.

In case the annular groove 71 is formed into such a shape due to shortage of the working precision as is narrowed toward the groove bottom, on the other hand, a deviation arises between the slope of the side wall face 72 of the annular groove 71 and the slope of the second sealing face 4, as shown in FIG. 2 or FIG. 4.

With the relief 5 being formed, the step portion between the relief 5 and the second sealing face 4, that is, the individual end edge portions of the boundary 51, the boundary 52 and the boundary 53 act as the sealing portions to make substantially linear sliding contact with the side wall face 72.

Here, the depth of the aforementioned relief 5 has to be set so that the individual end edge portions of the boundary 51, the boundary 52 and the boundary 53 may sufficiently function as the sealing portions. In short, the depth of the relief 5 has to be set by considering the relation to the angle (i.e., the angle which can be conceived in consideration of errors or the like) of the side wall face 72 of the annular groove 71.

More specifically, the depth of the relief 5 has to be set so that the end edge of the seal ring 1 on the inner circumference side may not abut against the side wall face 72 of the annular groove 71.

Moreover, the aforementioned step is formed at the joining portion between the boundary 51 and the boundary 52 and at the joining portion between the boundary 51 and the boundary 53, as described above.

Figure 17:
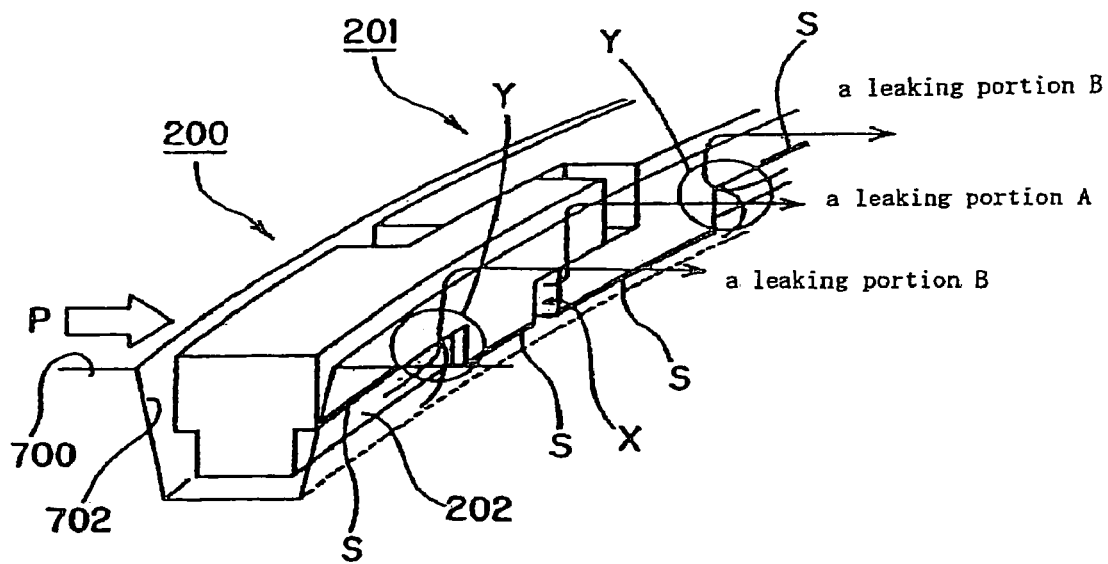
FIG. 17 is an explanatory view of the problem of the seal ring according to the conventional art.
Figure 18:
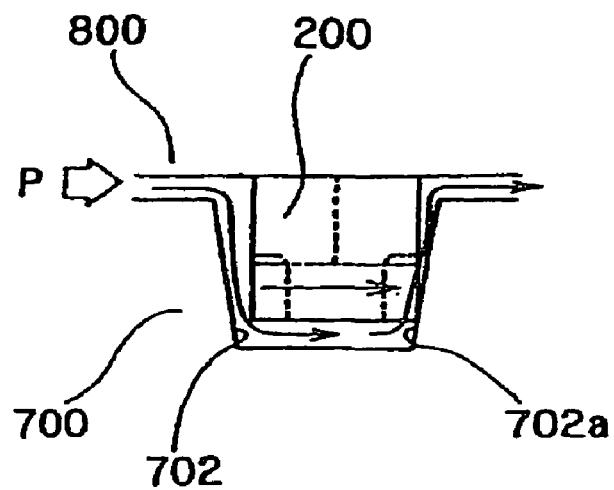
FIG. 18 is an explanatory view of the problem of the seal ring according to the conventional art.
Figure 19:
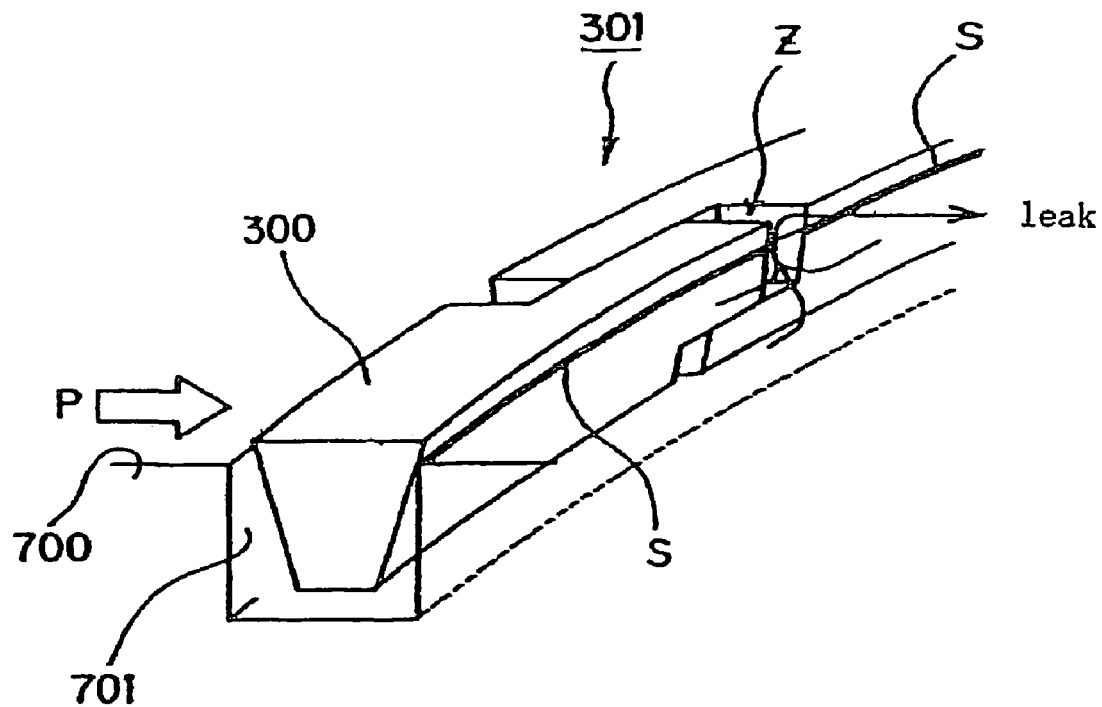
FIG. 19 is an explanatory view of a problem of the seal ring according to the conventional art.
Figure 20:
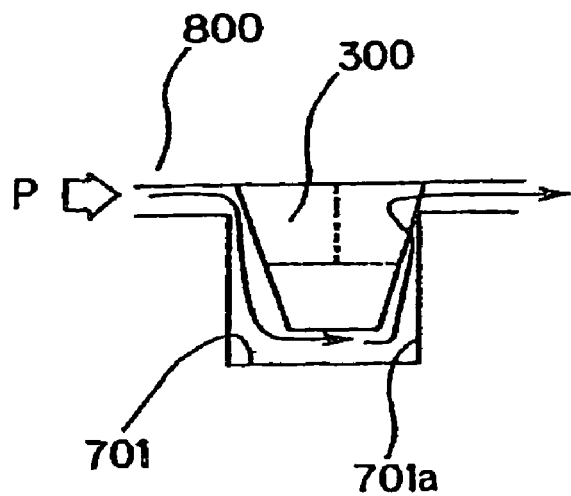
FIG. 20 is an explanatory view of the problem of the seal ring according to the conventional art.
Figure 21:
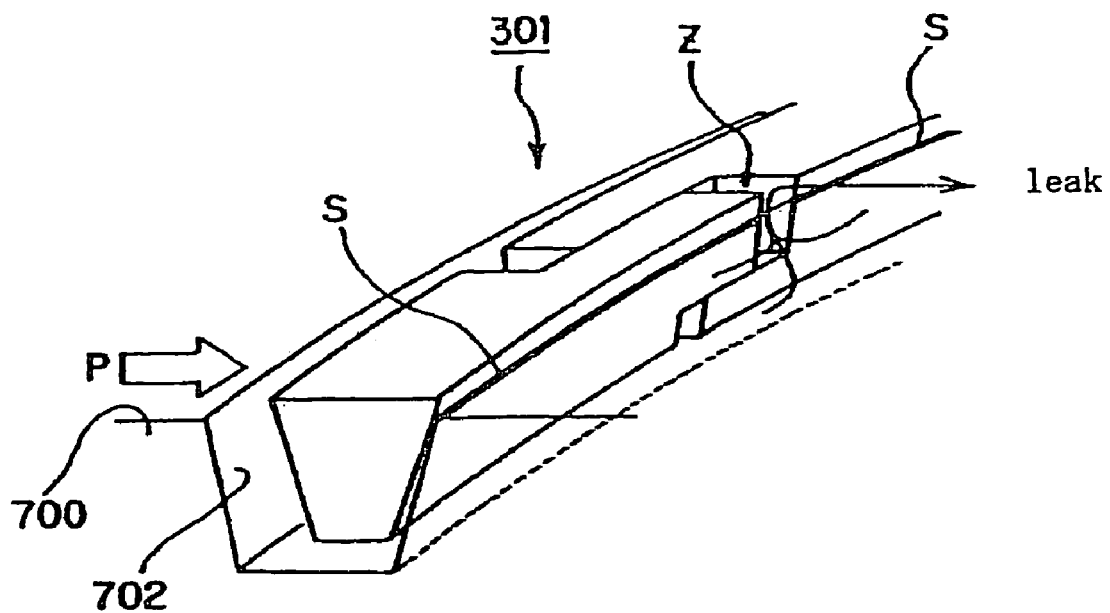
FIG. 21 is an explanatory view of the problem of the seal ring according to the conventional art.
Figure 22:
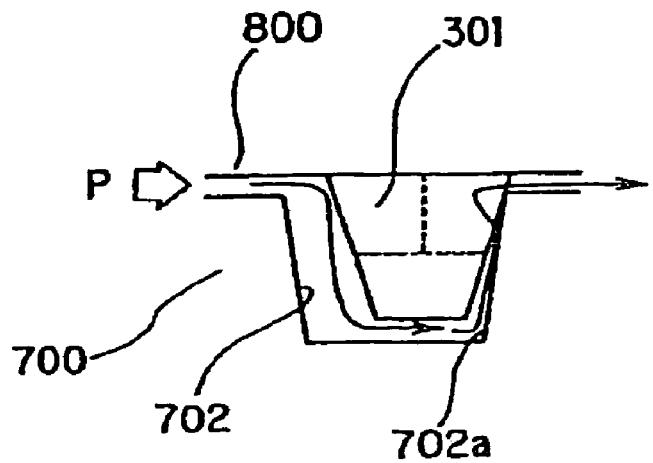
FIG. 22 is an explanatory view of the problem of the seal ring according to the conventional art.
Figure 23:
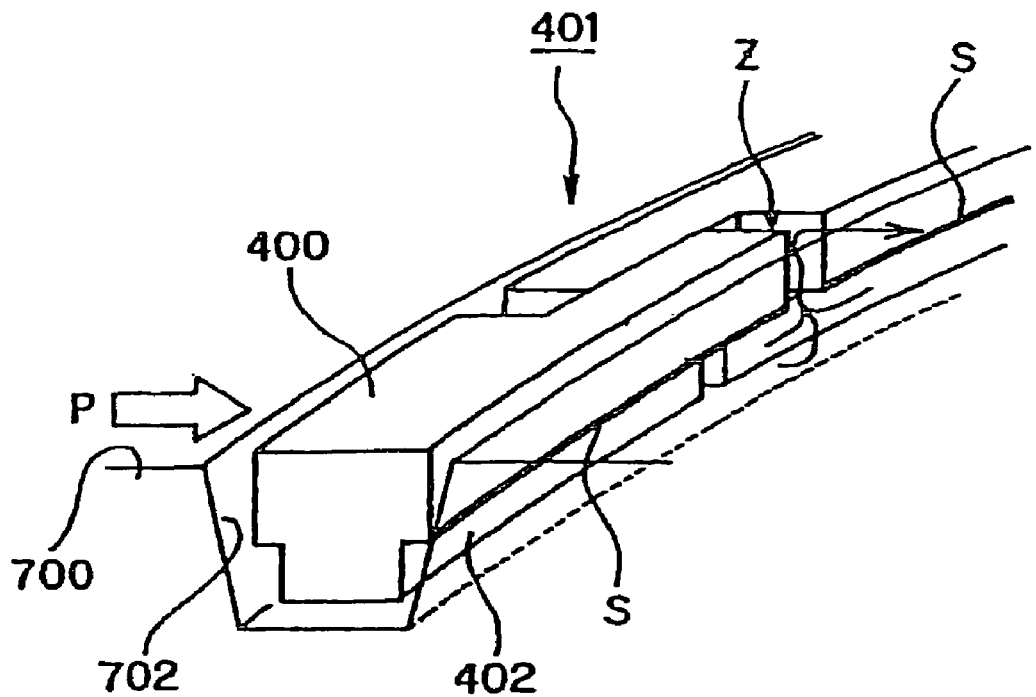
FIG. 23 is a perspective view showing the mounted state of the seal ring according to a virtual art.
Figure 24:
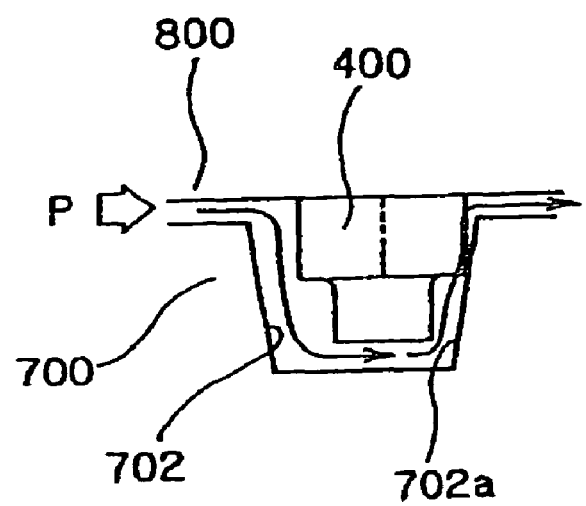
FIG. 24 is a schematic section showing the mounted state of the seal ring according to the virtual art.

However, these joining portions are made to join through the slope 54 and the slope 55 so that they can form relatively stable sealing portions. In other words, it is possible to substantially eliminate the leak (at a leaking portion B) from a portion Y of the aforementioned conventional art, as shown in FIG. 17.

In the construction, the boundaries 52 and 53 are arranged on the inner circumference side of the separating face 25. Therefore, the leakage from the clearance 29 on the inner circumference side of the separate portion 2 is reduced to some extent. By the seal ring 1 according to the embodiment of the invention thus far described, the leakage can be reduced together with the friction of the sliding rotations.

Even in case the slope of the side wall face 72 of the annular groove 71 and the slope of the second sealing face 4 deviate from each other, moreover, it is possible to reduce the leakage as much as possible.

As a result, the working precision of the annular groove can be relaxed to lead to the reduction in the cost. By intentionally deviating the slope of the side wall face 72 of the annular groove 71 and the slope of the second sealing face 4, moreover, the sealing portion can be made of not a facial contact but a substantially linear contact thereby to reduce the friction of the sliding rotations.

Here, it is desired from the viewpoint of sealing properties that the joining portion between the boundary 51 and the boundary 52 and the joining portion between the boundary 51 and the boundary 53 are gradually changed in width. Therefore, it is desired that the joining portions are made exclusively of the slope 54 and the slope 55, as described above.

As a matter of fact, however, a manufacturing problem may make it difficult to make those joining portions exclusively of the slopes, for example. Therefore, portions other than the slopes may exist within as far as the sealing properties are not substantially affected adversely.

One example is shown in FIG. 3.

As in the seal ring 1 shown in FIGS. 1 and 2, the slope 54 is formed at the joining portion between the boundary 51 and the boundary 52, as shown in FIGS. 3A and 3B. The slope 55 is also formed at the joining portion between the boundary 51 and the boundary 53.

In this example shown in FIGS. 3A and 3B, moreover, a perpendicular face 54a perpendicular to the boundary 52 is interposed between one end of the slope 54 and the boundary 52.

A perpendicular face 55a perpendicular to the boundary 53 is also likewise interposed between one end of the slope 55 and the boundary 53. These perpendicular face 54a and perpendicular face 55a are formed for a manufacturing problem of the seal ring.

In the absence of these perpendicular face 54a and perpendicular face 55a, a strong force is applied at a parting time of the mold for the seal ring to the boundary portion between the boundary 52 and the slope 54 and to the boundary portion between the boundary 53 and the slope 55.

This strong force raises a cause for shortening the lifetime of the mold.

In order to solve this drawback, therefore, the perpendicular face 54a and the perpendicular face 55a are provided. Considering only the viewpoint of the sealing properties, it is desired to make the joining portion between the boundary 51 and the boundary 52 and the joining portion between the boundary 51 and the boundary 53 exclusively of the slope 54 and the slope 55, as has been described hereinbefore.

In comparison with another advantage, however, some portion other than the slope may be contained within such a range as not to affect the sealing properties adversely.

For example, the slope 54 may contain a stepped portion 54b, as shown in FIG. 3C.

Second Embodiment

Figure 5:
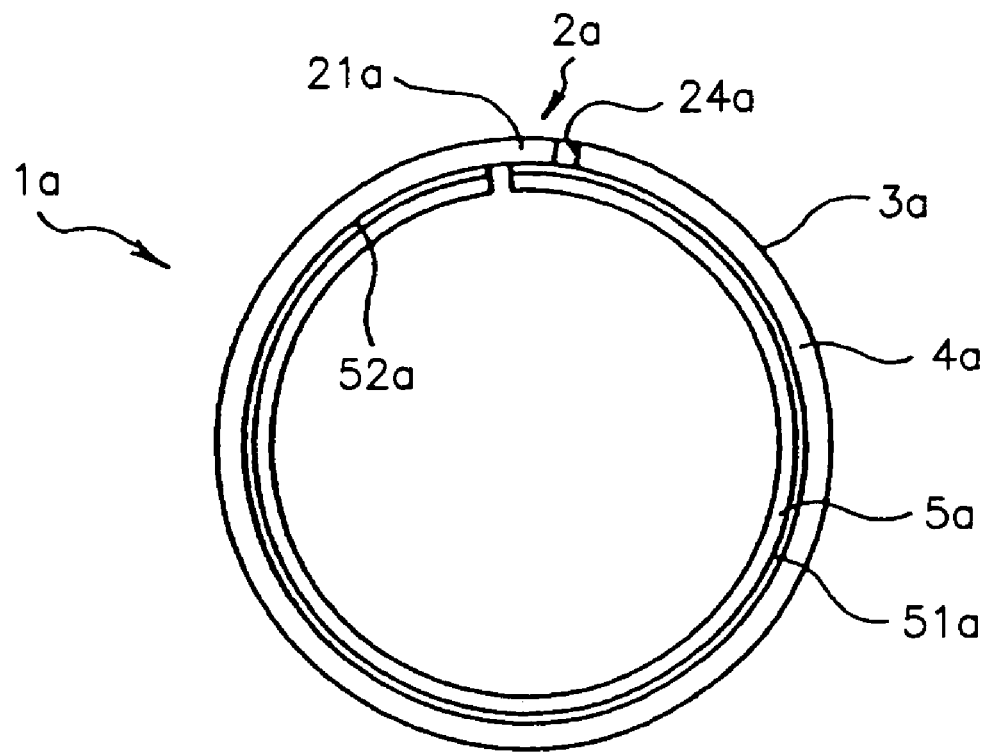
FIG. 5 is a top plan view of a seal ring according to a second embodiment of the invention.
Figure 6:
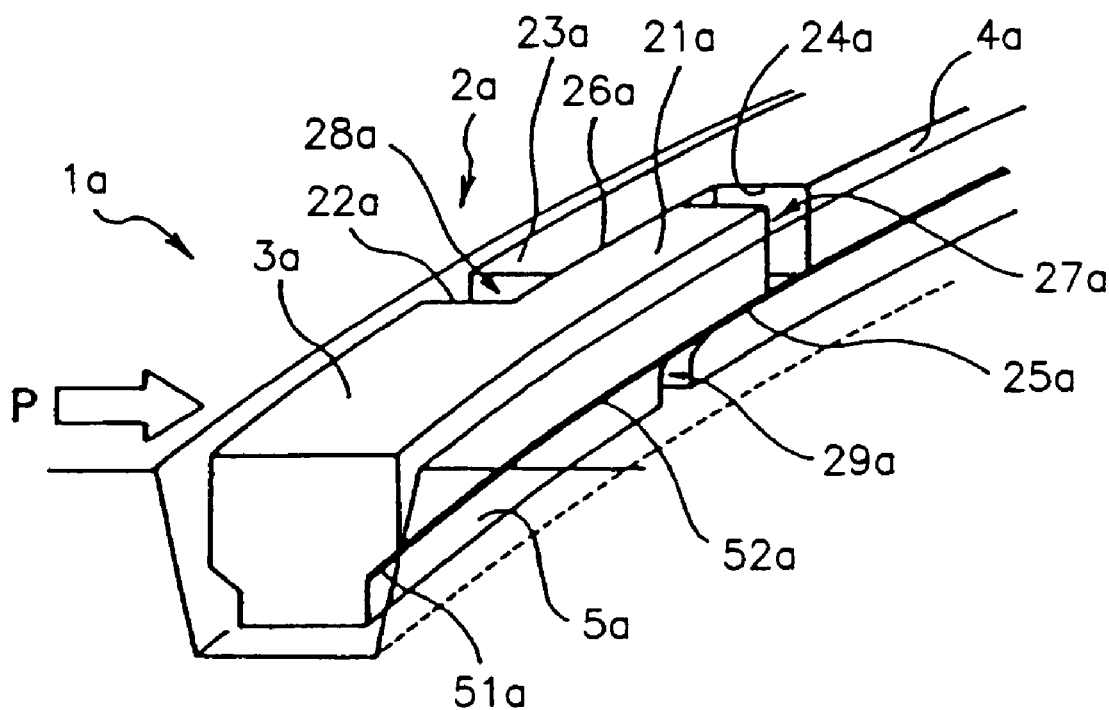
FIG. 6 is a broken perspective view of a portion showing the state, in which the seal ring according to the second embodiment of the invention is mounted.
Figure 7:
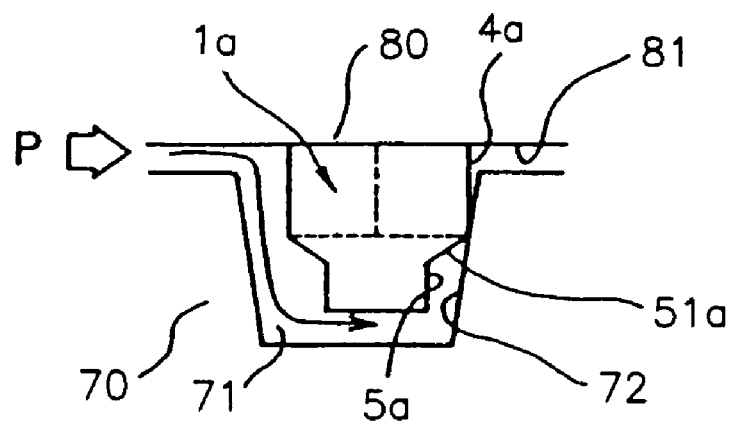
FIG. 7 is a schematic section showing the state, in which the seal ring according to the second embodiment of the invention is mounted.

A seal ring according to a second embodiment of the invention will be described with reference to FIG. 5 to FIG. 7. FIG. 5 is a top plan view of a seal ring according to a second embodiment of the invention. FIG. 6 is a broken perspective view of a portion showing the state, in which the seal ring according to the second embodiment of the invention is mounted. FIG. 7 is a schematic section showing the state, in which the seal ring according to the second embodiment of the invention is mounted.

As shown, the seal ring 1a seals the annular clearance between a housing 80 that has a bore and a shaft 70 inserted in the bore. This seal ring 1a is mounted for use in an annular groove 71 formed in the shaft 70.

The seal ring 1a is made of a resin material. The seal ring 1a is provided with a first sealing face 3a for sealing the inner circumference 81 of the bore formed in the housing 80, and a second sealing face 4a for sealing the side wall face 72 of the annular groove 71 formed in the shaft 70.

When a pressure is applied in the direction of arrow P, as shown in FIGS. 6 and 7, from the sealing fluid to the unsealing fluid, the seal ring 1a is pushed to the side of the unsealing fluid. Therefore, the second sealing face 4a pushes the side wall face 72 of the annular groove 71.

On the other hand, the first sealing face 3a pushes the inner circumference 81 of the bore confronting the annular groove 71. Thus, the first sealing face 3a and the second sealing face 4a seal at their respective positions.

Therefore, the seal ring 1a can prevent the sealing fluid from leaking to the side of the unsealing fluid.

Here, the sealing fluid is exemplified by lubricating oil, and indicates the ATF (Automatic Transmission Fluid) in case it is used in the transmission of an automobile.

On the other hand, the ring body of the seal ring 1 is provided with a separate portion 2a at one circumferential portion, as shown. One reason for this provision is to facilitate the work for mounting the seal ring 1 in position.

A variety of types have been known as that mode of the separate portion 2a. In this embodiment, a special step cut is adopted as the separate portion 2a. This special step cut has a construction cut into two steps.

Specifically, each of the first sealing face 3a and the second sealing face 4a is provided with the stepped separate portion, as shown.

By adopting this special step cut, the leakage can be reduced to properly match the change in the ambient temperature.

This special step cut is provided with a pair of a projection 21a and a depression 22a on one outer circumferential side across the separated portion and a pair of a depression 24a and a projection 23a on the other outer circumferential side. The construction is further made such that the projection 21a and the depression 24a fit each other whereas the depression 22a and the projection 23a fit each other.

The seal ring 1a adopting such special step cut can block the sealing fluid side and the unsealing fluid side such that the faces perpendicular to the circumferential direction form clearances (i.e., a clearance 27a formed between the leading end face of the projection 21a and the confronting face of the depression 24a, a clearance 28a formed between the leading end face of the projection 23a and the confronting face of the depression 22a, and a clearance 29a on the inner circumferential side, as shown in FIG. 6) with respect to the circumferential direction.

In other words, the projection 21a and the depression 24a are constructed to make sliding contact with not only a separating face 25a concentric with the first sealing face 3a but also a separating face 26a perpendicular to the axis.

This construction leaves any portion uninterrupted in the first sealing face 3a and in the second sealing face 4a by the separate portion 2a, even if the seal ring 1a has the clearance 27a, the clearance 28a and the clearance 29a, as described above.

Therefore, even if the seal ring 1a is expanded or contracted of its body by the ambient temperature to fluctuate the spacings of the clearance 27a, the clearance 28a and the clearance 29a, it can absorb the changes in the sizes of the clearances while keeping the sealed state.

As a result, the seal ring 1a can keep its sealing properties stably against the surrounding temperature change.

In order to satisfy the needs for reducing the friction of the sliding rotations, moreover, the seal ring 1a according to this embodiment is provided throughout its circumference with a relief (e.g., a depression, a notch or a lighting portion) 5a for reducing the pressure receiving area of the sliding face of the annular groove 71 against the side wall face 72.

Thus, the seal ring 1a according to this embodiment contemplates to reduce the friction of the sliding rotations by reducing the pressure receiving area.

In this embodiment, moreover, the relief 5a and the second sealing face 4a are joined to each other by a tapered face 51a. 32. On the other hand, the end edge of the separating face 25a is aligned to the outer circumference end edge of the tapered face 51a.

This construction forms such a continuous annular sealing portion with the outer circumference end edge of the tapered face 51a and the end edge of the separating face 25a as to seal the side wall face 72 of the annular groove 71.

In case the slope of the side wall face 72 of the annular groove 71 and the slope of the second sealing face 4a are made substantially equal to each other by the construction thus far described, the substantial entirety of the second sealing face 4a makes sliding contact with the side wall face 72 so that the construction sufficiently exhibits the sealing properties.

In the separate portion 2a, moreover, the end edge of the separating face 25a forms the sealing portion which can also prevent the leak of the sealing fluid from the clearance 27a or the clearance 29a.

In case the annular groove 71 is formed into such a shape due to shortage of the working precision as is narrowed toward the groove bottom, on the other hand, a deviation arises between the slope of the side wall face 72 of the annular groove 71 and the slope of the second sealing face 4a, as shown in FIG. 6 or FIG. 7.

In this case, this embodiment is provided with the relief 5a and the tapered face 51a so that the upper end edge of the tapered face 51a and the end edge of the separating face 25a form the continuous annular sealing portion for sealing the side wall face 72 of the annular groove 71.

Here, the depth of the aforementioned relief 5a and the tapering angle of the tapered face 51a have to be set so that the annular sealing portion may sufficiently function as the sealing portion. In short, these depth and angle have to be set by considering the relation to the angle (i.e., the angle which can be conceived in consideration of errors or the like) of the side wall face 72 of the annular groove 71.

More specifically, the depth of the relief 5a and the tapering angle of the tapered face 51a have to be set so that the end edge of the seal ring 1a on the inner circumference side may not abut against the side wall face 72 of the annular groove 71.

Thus in this embodiment, independently of whether the slope of the side wall face 72 of the annular groove 71 and the slope of the second sealing face 4a are equal or different, the outer circumference end edge of the tapered face 51a and the end edge of the separating face 25a form the continuous annular sealing portion for sealing the side wall face 72 of the annular groove 71.

As a result, the sealing portion is formed without any interruption throughout the whole circumference.

Independently of whether the slope of the side wall face 72 of the annular groove 71 and the slope of the second sealing face 4a are equal or different, therefore, it is possible to prevent the sealing fluid from leaking from the clearance 27a or the clearance 29a.

Moreover, the sealing properties are excellent because no portion is unstable in the sealing properties.

By the seal ring 1a according to the embodiment of the invention thus far described, the leakage can be reduced together with the friction of the sliding rotations.

Even in case the slope of the side wall face 72 of the annular groove 71 and the slope of the second sealing face 4a deviate from each other, moreover, it is possible to reduce the leakage as much as possible.

As a result, the working precision of the annular groove can be relaxed to lead to the reduction in the cost.

By intentionally deviating the slope of the side wall face 72 of the annular groove 71 and the slope of the second sealing face 4a, moreover, the sealing portion can be made of not a facial contact but a substantially linear contact thereby to reduce the friction of the sliding rotations.

Third Embodiment

Figure 8:
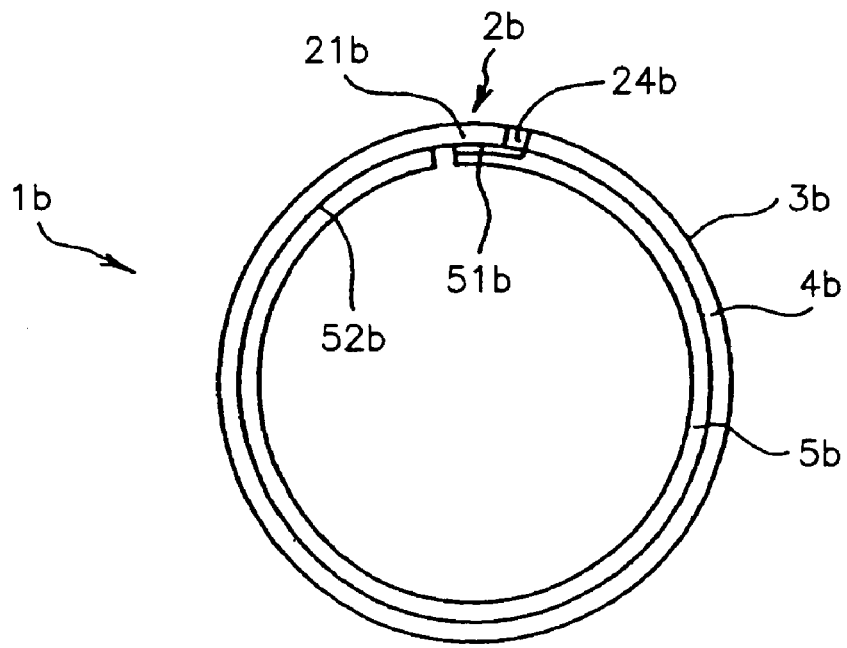
FIG. 8 is a top plan view of a seal ring according to a third embodiment of the invention.
Figure 9:
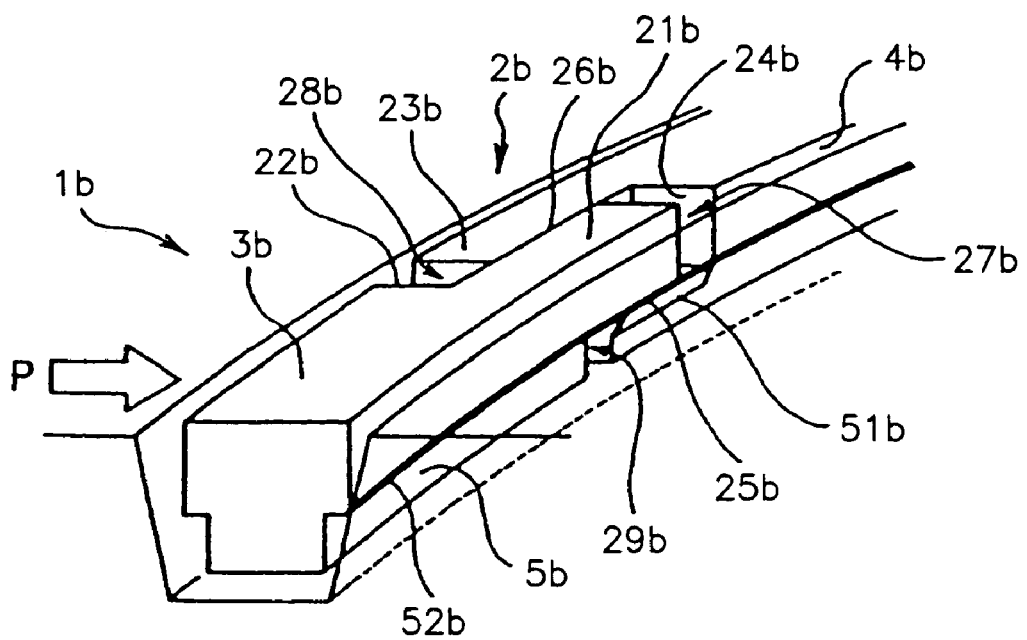
FIG. 9 is a broken perspective view of a portion showing the state, in which the seal ring according to the third embodiment of the invention is mounted.
Figure 10:
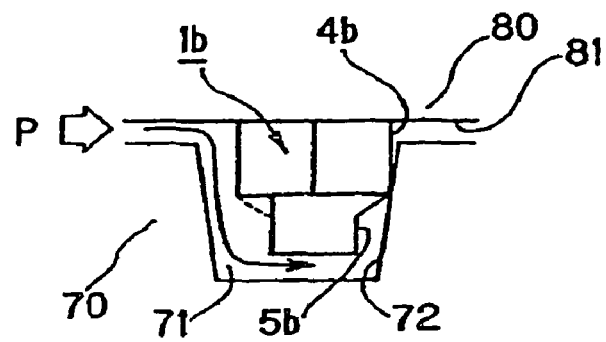
FIG. 10 is a schematic section showing the state, in which the seal ring according to the third embodiment of the invention is mounted.
Figure 11:
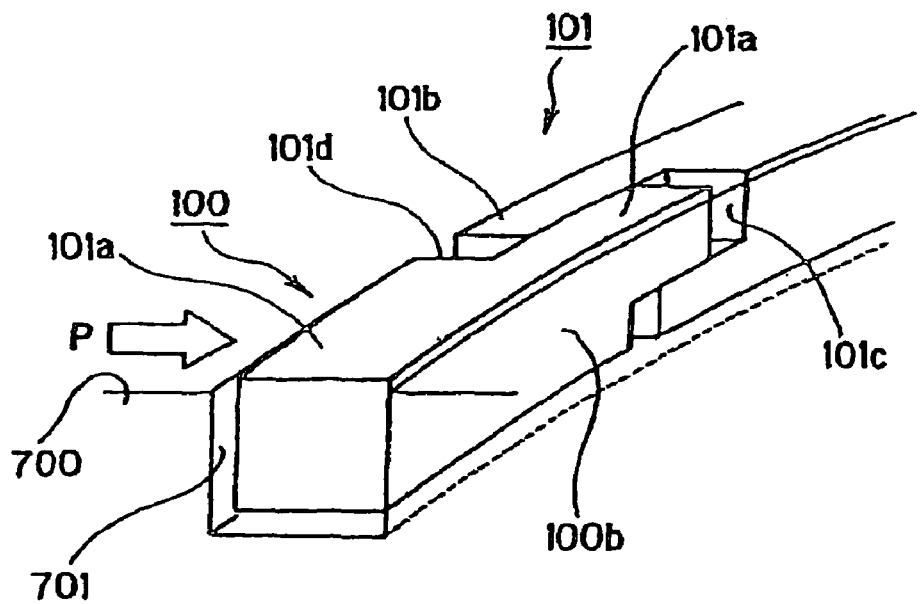
FIG. 11 is a perspective view showing the mounted state of the seal ring according to the conventional art.
Figure 12:
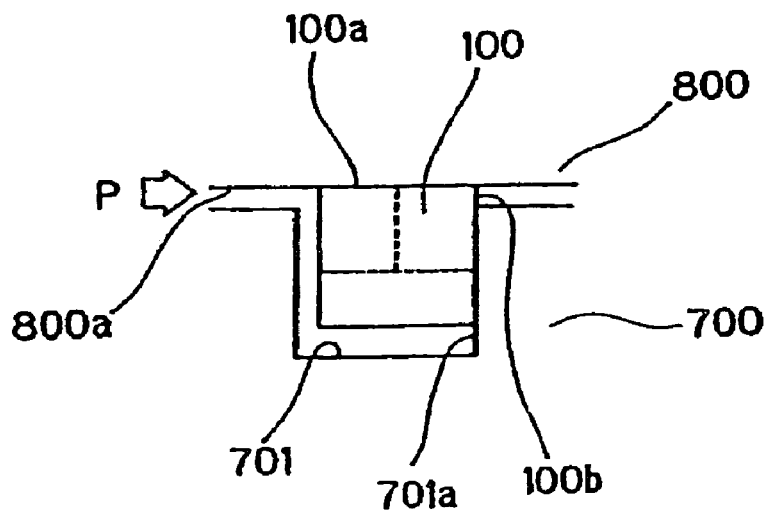
FIG. 12 is a schematic section showing the mounted state of the seal ring according to the conventional art.
Figure 13:
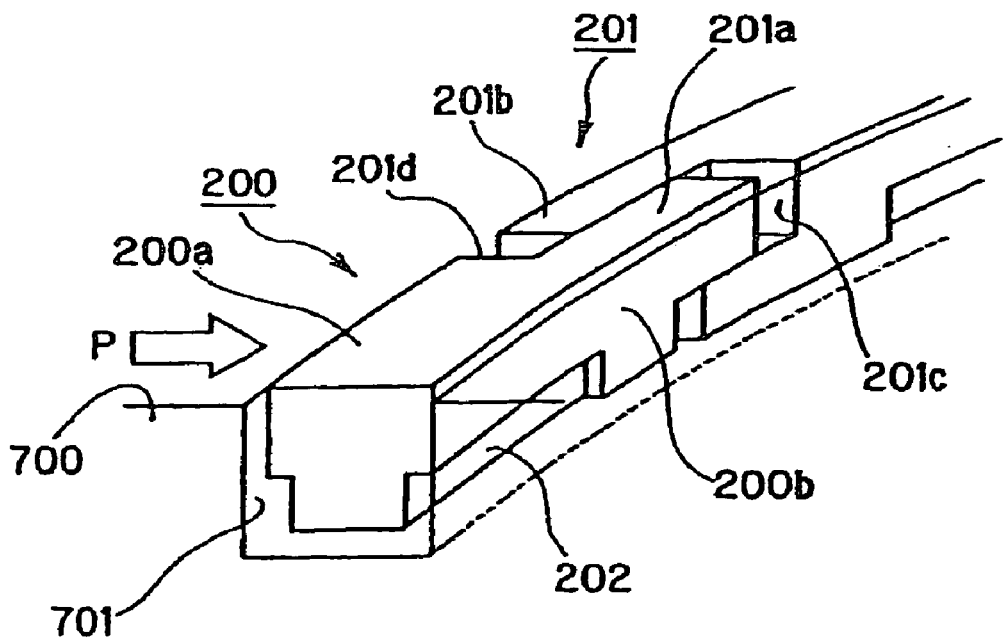
FIG. 13 is a perspective view showing the mounted state of the seal ring according to the conventional art.
Figure 14:
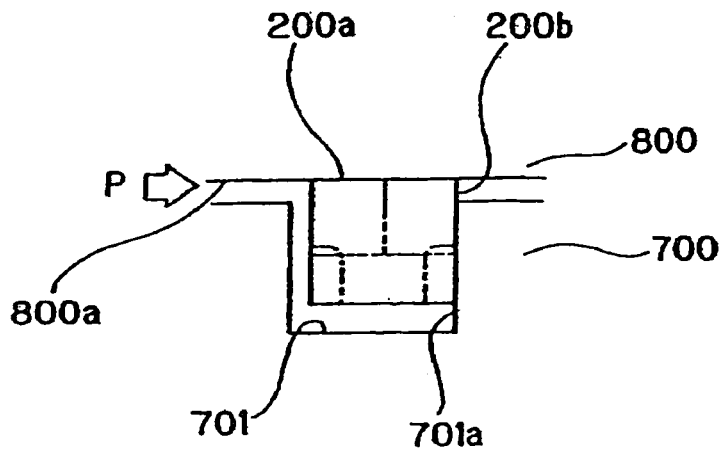
FIG. 14 is a schematic section showing the mounted state of the seal ring according to the conventional art.
Figure 15:
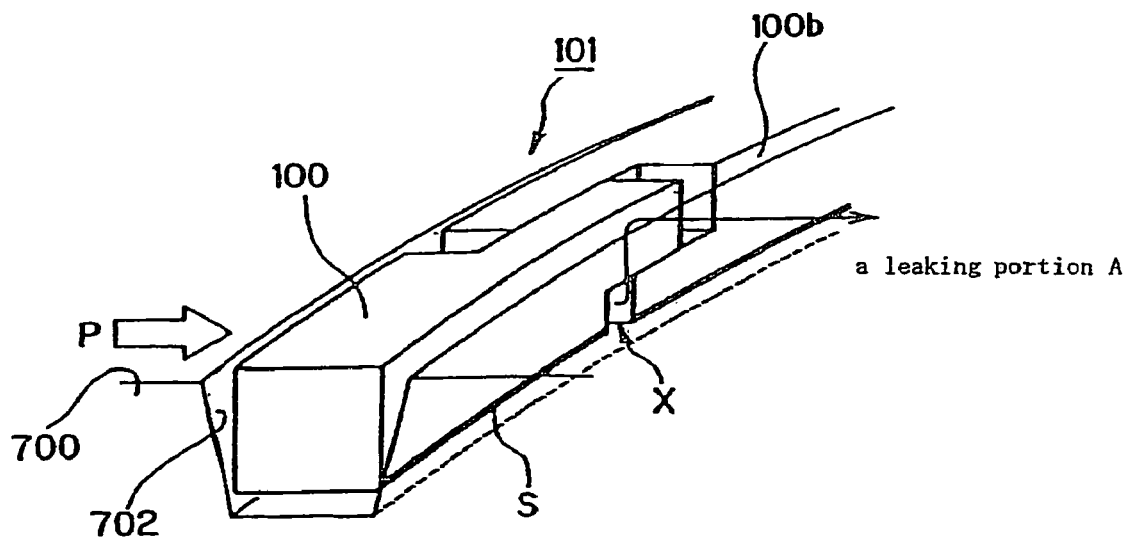
FIG. 15 is an explanatory view of a problem of the seal ring according to the conventional art.
Figure 16:
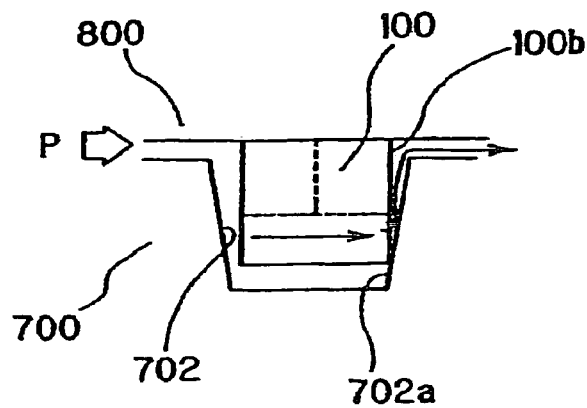
FIG. 16 is an explanatory view of a problem of the seal ring according to the conventional art.

A seal ring according to a third embodiment of the invention will be described with reference to FIG. 8 to FIG. 10. FIG. 8 is a top plan view of the seal ring according to a third embodiment of the invention. FIG. 9 is a broken perspective view of a portion showing the state, in which the seal ring according to the third embodiment of the invention is mounted. FIG. 10 is a schematic section showing the state, in which the seal ring according to the third embodiment of the invention is mounted.

As shown, the seal ring 1b seals the annular clearance between a housing 80 that has a bore and a shaft 70 inserted in the bore. This seal ring 1b is mounted for use in an annular groove 71 formed in the shaft 70.

The seal ring 1b is made of a resin material. The seal ring 1b is provided with a first sealing face 3b for sealing the inner circumference 81 of the bore formed in the housing 80, and a second sealing face 4b for sealing the side wall face 72 of the annular groove 71 formed in the shaft 70.

When a pressure is applied in the direction of arrow P, as shown in FIGS. 9 and 10, from the sealing fluid to the unsealing fluid, the seal ring 1b is pushed to the side of the unsealing fluid. Therefore, the second sealing face 4b pushes the side wall face 72 of the annular groove 71.

On the other hand, the first sealing face 3b pushes the inner circumference 81 of the bore confronting the annular groove 71. Thus, the first sealing face 3b and the second sealing face 4b seal at their respective positions. Therefore, the seal ring 1b can prevent the sealing fluid from leaking to the side of the unsealing fluid.

Here, the sealing fluid is exemplified by lubricating oil, and indicates the ATF (Automatic Transmission Fluid) in case it is used in the transmission of an automobile.

On the other hand, the ring body of the seal ring 1b is provided with a separate portion 2b at one circumferential portion, as shown. One reason for this provision is to facilitate the work for mounting the seal ring 1b in position. A variety of types have been known as that mode of the separate portion 2b.

In this embodiment, a special step cut is adopted as the separate portion 2b. This special step cut has a construction cut into two steps. Specifically, each of the first sealing face 3b and the second sealing face 4b is provided with the stepped separate portion, as shown. By adopting this special step cut, the leakage can be reduced to properly match the change in the ambient temperature.

This special step cut is provided with a pair of a projection 21b and a depression 22b on one outer circumferential side across the separated portion and a pair of a depression 24b and a projection 23b on the other outer circumferential side.

The construction is further made such that the projection 21b and the depression 24b fit each other whereas the depression 22b and the projection 23b fit each other.

The seal ring 1b adopting such special step cut can block the sealing fluid side and the unsealing fluid side such that the faces perpendicular to the circumferential direction form clearances (i.e., a clearance 27b formed between the leading end face of the projection 21b and the confronting face of the depression 24b, a clearance 28b formed between the leading end face of the projection 23b and the confronting face of the depression 22b, and a clearance 29b on the inner circumferential side, as shown in FIG. 9) with respect to the circumferential direction.

In other words, the projection 21b and the depression 24b are constructed to make sliding contact with not only a separating face 25b concentric with the first sealing face 3b but also a separating face 26b perpendicular to the axis.

This construction leaves any portion uninterrupted in the first sealing face 3b and in the second sealing face 4b by the separate portion 2b, even if the seal ring 1a has the clearance 27b, the clearance 28b and the clearance 29b, as described above.

Therefore, even if the seal ring 1b is expanded or contracted of its body by the ambient temperature to fluctuate the spacings of the clearance 27b, the clearance 28b and the clearance 29b, it can absorb the changes in the sizes of the clearances while keeping the sealed state.

As a result, the seal ring 1b can keep its sealing properties stably against the surrounding temperature change.

In order to satisfy the needs for reducing the friction of the sliding rotations, moreover, the seal ring 1b according to this embodiment is provided throughout its circumference with a relief (e.g., a depression, a notch or a lighting portion) 5b for reducing the pressure receiving area of the sliding face of the annular groove 71 against the side wall face 72.

Thus, the seal ring 1b according to this embodiment contemplates to reduce the friction of the sliding rotations by reducing the pressure receiving area.

In this embodiment, moreover, a tapered face 51b is formed at the position having the depression 24b.

On the other hand, the end edge of the separating ace 25b is aligned to the outer circumference end edge of the tapered face 51b.

This construction forms such a continuous annular sealing portion with the end edge of a boundary 52b between the relief 5b and the second sealing face 4b and the end edge of the separating face 25b as to seal the side wall face 72 of the annular groove 71.

In case the slope of the side wall face 72 of the annular groove 71 and the slope of the second sealing face 4b are made substantially equal to each other by the construction thus far described, the substantial entirety of the second sealing face 4b makes sliding contact with the side wall face 72 so that the construction sufficiently exhibits the sealing properties.

In the separate portion 2b, moreover, the end edge of the separating face 25b forms the sealing portion which can also prevent the leak of the sealing fluid from the clearance 27b or the clearance 29b.

In case the annular groove 71 is formed into such a shape due to shortage of the working precision as is narrowed toward the groove bottom, on the other hand, a deviation arises between the slope of the side wall face 72 of the annular groove 71 and the slope of the second sealing face 4b, as shown in FIG. 9 or FIG. 10.

In this case, this embodiment is provided with the relief 5b and the tapered face 51b so that the end edge of the boundary 52b between the relief 5b and the second sealing face 4b and the end edge of the separating face 25b form the continuous annular sealing portion for sealing the side wall face 72 of the annular groove 71.

Here, the depth of the aforementioned relief 5b and the tapering angle of the tapered face 51b have to be set so that the annular sealing portion may sufficiently function as the sealing portion. In short, these depth and angle have to be set by considering the relation to the angle (i.e., the angle which can be conceived in consideration of errors or the like) of the side wall face 72 of the annular groove 71.

More specifically, the depth of the relief 5b and the tapering angle of the tapered face 51b have to be set so that the end edge of the seal ring 1b on the inner circumference side may not abut against the side wall face 72 of the annular groove 71.

Thus in this embodiment, independently of whether the slope of the side wall face 72 of the annular groove 71 and the slope of the second sealing face 4b are equal or different, the end edge of the boundary 52b between relief 5b and the second sealing face 4b and the end edge of the separating face 25b form the continuous annular sealing portion for sealing the side wall face 72 of the annular groove 71.

As a result, the sealing portion is formed without any interruption throughout the whole circumference. Independently of whether the slope of the side wall face 72 of the annular groove 71 and the slope of the second sealing face 4b are equal or different, therefore, it is possible to prevent the sealing fluid from leaking from the clearance 27b or the clearance 29b.

Moreover, the sealing properties are excellent because no portion is unstable in the sealing properties.

By the seal ring 1b according to the embodiment of the invention thus far described, the leakage can be reduced together with the friction of the sliding rotations.

Even in case the slope of the side wall face 72 of the annular groove 71 and the slope of the second sealing face 4b deviate from each other, moreover, it is possible to reduce the leakage as much as possible.

As a result, the working precision of the annular groove can be relaxed to lead to the reduction in the cost.

By intentionally deviating the slope of the side wall face 72 of the annular groove 71 and the slope of the second sealing face 4b, moreover, the sealing portion can be made of not a facial contact but a substantially linear contact thereby to reduce the friction of the sliding rotations.

INDUSTRIAL APPLICABILITY

According to the invention, as has been described hereinbefore, the leakage can be reduced together with the friction of the sliding rotations.

The invention claimed is:

1. A seal assembly comprising:
a ring body, a first sealing face of the body for sealing rite a surface of one of two members which are assembled concentrically with and rotatably relative to each other;
a second sealing face of the body sealing a side wall face of an annular groove formed in the other of said two members as is located on a side of an unsealing fluid so that an annular clearance between said two members is sealed by the first and the second sealing faces;
a separate portion separated at one circumferential portion of the body;
a relief portion of the body having a tapered face formed throughout a circumference of said second sealing face of the body for keeping the body out of abutment against the side wall face of said annular groove on the side of said unsealing fluid; and
a continuous annular sealing edge of the body formed on said second sealing face even in the a state where the a slope of the side wall face of said annular groove on the side of said unsealing fluid and a slope of the tapered face of said second sealing face are different,
said continuous annular sealing edge barrier including overlapping end portions at said separate portion for sealing the side wall face of said annular groove,
said continuous annular sealing edge defined by an edge portion of the body forming a circular line.

2. The seal assembly as set forth in claim 1, wherein said continuous annular sealing edge is kept in a state to continuously contact with the side wall face of said annular groove on the side of the unsealing fluid irrespective of a change in a size of a clearance between faces of said separate portion as are substantially perpendicular to the circumferential direction.

3. The seal assembly as set forth in claim 1, wherein said relief portion is formed so as not to obstruct the formation of said annular sealing portion edge.

4. The seal assembly as set forth in claim 1, wherein said separate portion contains a separating face concentric to said first sealing face, and an end edge of said separating face located on the side of said annular groove on the side of the unsealing fluid forms a portion of said annular sealing edge.

* * * * *